United States Patent

Paget et al.

[11] 4,013,687
[45] Mar. 22, 1977

[54] ANTHRAQUINONE DISPERSING AGENTS

[75] Inventors: Hugh Patrick Dryhurst Paget; Leslie Richard Rogers; James Kenneth Davenport Royle; James Frederick Stansfield; Arthur Topham, all of Manchester, England

[73] Assignee: Imperial Chemical Industries Limited, London, England

[22] Filed: Dec. 10, 1974

[21] Appl. No.: 531,370

Related U.S. Application Data

[63] Continuation-in-part of Ser. No. 432,989, Jan. 14, 1974, abandoned, which is a continuation-in-part of Ser. No. 219,843, Jan. 21, 1972, abandoned.

[30] Foreign Application Priority Data

Feb. 11, 1971 United Kingdom .............. 4445/71

[52] U.S. Cl. .............................. 260/376; 260/372; 260/377
[51] Int. Cl.² ..................... C09B 1/16; C09B 1/503
[58] Field of Search .................. 260/372, 376, 377; 252/357; 106/308 N

[56] References Cited

UNITED STATES PATENTS

| | | | |
|---|---|---|---|
| 2,302,697 | 11/1942 | Katzman | 252/357 |
| 2,329,798 | 9/1943 | Tatum | 260/376 |
| 2,338,908 | 1/1944 | Dickey et al. | 260/376 |
| 2,440,349 | 4/1948 | Schaeffer | 252/357 UX |
| 2,442,972 | 6/1948 | Edelstein | 106/308 N X |

Primary Examiner—Allen B. Curtis
Attorney, Agent, or Firm—Cushman, Darby & Cushman

[57] ABSTRACT

Dyestuffs of the formulae

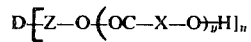

and

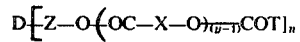

wherein D is the radical of an anthraquinone dyestuff which is attached to Z through a carbon atom of an aromatic ring present in D; Z is a divalent bridging group; $n$ is a positive integer having a value of 1 to 4; X is a divalent saturated or unsaturated aliphatic radical containing at least 8 carbon atoms and in which there are at least 4 carbon atoms between the —CO— and —O— groups; T is a saturated or unsaturated aliphatic radical of from 8–20 carbon atoms and $y$ is a positive number in the range 2–20 inclusive.

A process for making the above dyestuffs and their use as dispersing agents in the stabilization of dispersions of finely divided solids.

4 Claims, No Drawings

ANTHRAQUINONE DISPERSING AGENTS

This application is a continuation-in-part of our application Ser. No. 432,989 which was filed in the U.S. Patent Office 14th Jan., 1974, now abandoned which was a continuation-in-part of our application Ser. No. 219,843 which was filed in the U.S. Patent Office on 21st Jan., 1972, and was subsequently abandoned.

This invention relates to dyestuffs containing the residue of a polyester which are valuable as dispersing agents in the production of dispersions of pigments in organic solvents.

According to the invention there are provided the dyestuffs of the formula:

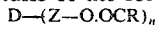
D—(Z—O.OCR)$_n$ wherein D is the radical of a dyestuff which is attached to Z through a carbon atom of an aromatic ring present in D; Z is a divalent bridging group; n is a positive integer having a value of from 1 to 8; and R is the radical of a carboxy ended polyester RCOOH derived from a hydroxycarboxylic acid of the formula:

HO — X — COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

The dyestuff radical represented by D can be a radical of any of the known dyestuff series, such as an azo or phthalocyanine radical but more particularly D is an anthraquinone radical. Anthraquinone compounds which are water soluble are not particularly suitable for the preparation of the dispersing agents of the invention and it is therefore preferred that the anthraquinone compound used to prepare the dispersing agents is free from water solubilizing groups such as for example sulphonic acid or carboxylic acid groups.

Where D is an azo or anthraquinone radical, n is preferably in the range 1 to 4 and where D is a phthalocyanine radical n is preferably between 1 and 5 inclusive. When n is 4 or less there may be only one side chain on each of the benzene rings of the phthalocyanine radical but when n = 5 or more, one or more of the benzene rings must contain at least 2 side chains.

The bridging group Z can be more specifically represented by the formula:

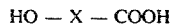
—(B)$_m$A— wherein B can be —NH—, —SO$_2$NH— or —CONH—, m can be 0 or 1 and A can be alkylene, or β-hydroxyalkylene, the alkylene group preferably containing less than 21 carbon atoms or monocyclic arylene-lower-alkylene, the term lower alkylene referring to alkylene groups containing up to 4 carbon atoms. As examples of the alkylene radicals represented by A there may be mentioned —CH$_2$—, —CH$_2$CH$_2$— and —C$_{17}$H$_{34}$— and as examples of the β-hydroxyalkylene radicals there may be mentioned —CH$_2$CHOH CH$_2$—. As examples of the arylene-lower-alkylene radicals represented by A there may be mentioned tolylene, xylylene and p-dimethylene-phenylene.

The dyestuffs of this invention can be more specifically represented by the formula:

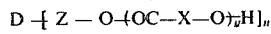
D—[Z — O—(OC—X—O)$_y$H]$_n$ or

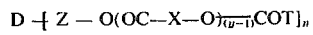
D—[Z — O(OC—X—O)$_{(y-1)}$COT]$_n$ wherein D, Z, X and n have the above defined meanings, T is a saturated or unsaturated aliphatic radical of from 8 to 20 carbon atoms, any y is a positive integer between 2 and 20.

According to a further feature of the invention there is provided a process for the manufacture of the dyestuffs of the invention as hereinbefore defined which comprises reacting a dyestuff compound of the formula:

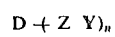
D—(Z Y)$_n$ wherein D, Z and n have the meanings stated and Y is a chlorine or a bromine atom, with one or more polyesters of the formula:

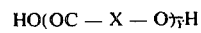
HO(OC — X — O)$_y$H or

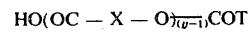
HO(OC — X — O)$_{(y-1)}$COT where the former polyester is produced by the polymerisation of the hydroxy carboxylic acid HO—X—COOH and the latter polyester is produced by polymerisation of the hydroxy carboxylic acid HO—X—COOH in the presence of the carboxylic acid T.COOH wherein, D, y, X and T have the above defined meanings. Alternatively the free carboxylic acid group of the polyester (RCOOH) can be converted to an acid chloride (RCOCl) by reaction with for example thionyl chloride (SOCl$_2$) and the acid chloride (RCOCl) reacted with a dyestuff containing a free amino group DNH$_2$ to produce a dispersant having the formula DNHCOR wherein D and R have the meanings defined hereinbefore.

The reaction between the dyestuff D(Z — Y)$_n$ or DNH$_2$ and the polyester or polyester chloride (RCOCl) is carried out in the presence of a quaternary ammonium compound and an acid binding agent.

The process of the invention can be conveniently carried out by stirring the reactants together in an organic liquid, the reaction being carried out at a temperature up to the boiling point of the reaction medium. The reaction is preferably carried out under anhydrous conditions, and, in the event that water is formed in the reaction or any of the reactants contain water or are used in the form of aqueous solutions, it is advisable to carry out the reaction at such a temperature that the water present distils off from the reaction medium. At the conclusion of the reaction the organic liquid can be removed, for example by distillation; or the mixture may be filtered, the filtrate extracted with water to remove the quaternary ammonium or phosphonium compound and any inorganic salts present, and then with a solvent such as isobutanol to remove any unreacted polyester, and the organic liquid then removed, for example by distillation or evaporation.

When the quaternary ammonium or phosphonium compound is a quaternary ammonium hydroxide then, provided that sufficient is present, this also acts as the acid-binding agent. However, the quaternary ammonium or phosphonium compound is normally used as a catalyst for the reaction, so that whilst stoichiometric amounts can be added if desired, the use of such large amounts is in fact unnecessary, and amounts in the region of 1 to 30% based on the weight of dyestuff compound are adequate.

The polyesters used in the process of the invention can for example be obtained by heating the hydroxycarboxylic acid or a mixture of such acids or a mixture of the hydroxycarboxylic acid and a carboxylic acid, optionally in the presence of an esterification catalyst, preferably at a temperature in the region of 160° to 200° C, until the required molecular weight has been obtained. The course of the esterification can be followed by measuring the acid value of the product, the preferred polyesters having acid values in the range of 10 to 100 mgms KOH/gm and especially in the range 20 to 50 mgms KOH/gm. The conditions of polymerisation are such that the acid value is a measure of the chain length ($y$ in the above formula) of the polyester. In the case of the preferred polyesters an acid value of 10 mgms KOH/gm corresponds to a polyester containing 20 molecules of hydroxy carboxylic acid (i.e. $y = 20$) whereas an acid value of 100 corresponds to a polyester containing 2 molecules of hydroxy carboxylic acid (i.e. $y = 2$). The water formed in the esterification reaction is removed from the reaction medium, and this can be conveniently done by passing a stream of nitrogen over the reaction mixture or, preferably, by carrying out the reaction in the presence of a solvent, such as toluene or xylene, and distilling off the water as it is formed. The resulting polyesters can be isolated in the conventional manner.

In the said hydroxycarboxylic acids the radical represented by X preferably contains from 12 to 20 carbon atoms, and it is further preferred that there are between 8 and 14 carbon atoms between the carboxylic acid and hydroxy groups. It is also preferred that the hydroxy group is a secondary hydroxy group.

As specific examples of such hydroxycarboxylic acids there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated caster oil fatty acid which contains in addition to 12-hydroxystearic acid minor amounts of stearic acid and palmitic acid.

The carboxylic acids which can be used in conjunction with the hydroxycarboxylic acids to obtain the polyesters are preferably saturated or unsaturated aliphatic carboxylic acids, particularly alkyl and alkenyl carboxylic acids containing a chain of from 8 to 20 carbon atoms. As examples of such acids there may be mentioned lauric acid, palmitic acid, stearic acid and oleic acid.

The dyestuff compounds which can be used in the process of the invention can themselves be prepared by standard known methods for the introduction of groups of the formula: —Z—Y into dyestuff compounds. Thus, for example, chloromethyl or bromomethyl groups can be introduced by treating the appropriate dyestuff compound with formaldehyde or paraformaldehyde in the presence of hydrogen chloride, chlorosulphonic acid or hydrogen bromide. γ-chloro-β-hydroxypropylamino or γ-bromo-β-hydroxypropylamino groups can be introduced by reacting the corresponding dyestuff containing an amino group with epichlorohydrin or with epibromohydrin, and N-(chloro- or bromoalkyl)sulphonamide groups can be introduced by treating the appropriate dyestuff compound with chlorosulphonic acid and reacting the resulting sulphonchloride with a chloro- or bromo- alkylamine.

As specific examples of the said dyestuff compounds containing at least one reactive chlorine or bromine atom there may be mentioned copper tris(chloromethyl)phthalocyanine, 1:4-bis(γ-chloro-β-hydroxypropylamino)anthraquinone, 2-methyl-4-N:N-di(β-hydroxyethyl)amino-4'-(N-β-chloroethyl sulphonamido)-azobenzene, 1-(γ-chloro-β-hydroxypropylamino)-4-[4'-β-hydroxyethoxy)phenylamino]-anthraquinone, copper mono(chloromethyl)phthalocyanine and copper pentakis-(chloromethyl)phthalocyanine.

As examples of acid-binding agents which can be used in the process of the invention there may be mentioned sodium carbonate and sodium or potassium hydroxide.

As examples of organic liquids which can be used in the process there may be mentioned ketones such as methyl isobutyl ketone, hydrocarbon liquids such as petroleum fractions, toluene and xylene, and halogenated hydrocarbons with an unreactive halogen atom such as chlorobenzene.

As examples of quaternary ammonium or phosphonium compounds there may be mentioned cetyl trimethylammonium bromide, tetraethyl ammoniumhydroxide, dodecyltrimethylammonium bromide and n-hexadecyl tri-n-propylphosphonium bromide.

The dyestuffs of the invention are of value as dispersing agents in preparing dispersions of pigments in organic liquids, and such dispersions form a further feature of the invention. In preparing the dispersions it has been found that it is not essential to use pure dyestuffs, since dyestuffs obtained by the process of the invention, which initially contain inorganic salts, quaternary ammonium or phosphonium compound and any unreacted polyester are equally suitable as it has been found that the presence of such compounds does not adversely affect the formation of the dispersions. Accordingly this reduces the cost of the dispersing agents by removing the necessity of purifying them. In fact when the dyestuff has been prepared in a suitable organic liquid medium the resulting solution of the dyestuff can be used directly for the preparation of the dispersion without even the necessity to remove the organic liquid.

According to a further feature of the invention there are provided finely divided dispersions of pigments in organic liquids which contain dissolved therein a dyestuff containing at least one residue of a polyester as hereinbefore defined.

The said dispersions can be obtained by any of the conventional and well known methods of preparing dispersions. Thus the pigment, the organic liquid and the dyestuff may be mixed in any order and the mixture then subjected to a mechanical treatment to reduce the particle size of the pigment, for example by ball milling, bead milling or gravel milling until the dispersion is formed. Preferably the mechanical treatment is carried out until the particle size of the pigment is less than 20 microns and preferably less than 10 microns.

If desired the dispersion can contain other substances, such as zinc rosinate, which are conventionally present in dispersions of pigments in organic liquids.

Alternatively, the pigment can be treated to reduce its particle size independently or in admixture with either the organic liquid or the dyestuff, and the other ingredient or ingredients then added following which dispersion can be obtained by stirring the mixture. As a further alternative an organic liquid solution of the dyestuff can be emulsified into an aqueous phase by known means, such as high speed stirring, in the presence of one or more surface active agents, and the resulting emulsion added to an aqueous slurry of the pigment, after which the organic liquid and the water are removed by filtration and drying of the residue of pigment and dyestuff. This residue can be subsequently dispersed in an organic medium. Compositions, obtained in this way and comprising the pigment in finely divided form and the dyestuff are a further feature of the invention.

It is preferred that the amount of dyestuff present in the dispersions is such as corresponds to between 5 and 50% by weight, and preferably between 10 and 30%, based on the weight of the pigment, and the dispersions preferably contain from 5 to 70% by weight of the pigment based on the total weight of the dispersion.

The organic liquids used to prepare the said dispersions can be any inert organic liquids in which the said dyestuffs are at least partly soluble at ambient temperatures and which are stable under the subsequent conditions of usage of the dispersion. If desired mixtures of organic liquids can be used. Preferred organic liquids are hydrocarbons and halogenated hydrocarbons such as benzene, toluene, xylene, white spirit, n-hexane, cyclohexane, chlorobenzene, carbon tetrachloride, and perchloroethylene. Other organic liquids can however be used, for example esters such as alkyd resins and heat bodied linseed oils used as lithographic varnish media. Above all it is preferred that the organic liquid is a predominantly aliphatic petroleum fraction. In general, the organic liquids or mixtures thereof used to prepare the dispersions will depend on the subsequent uses to which the dispersions are to be put.

The pigments can be either inorganic or organic pigments, and can be of any of the recognised classes of pigments. As examples of inorganic pigments there may be mentioned titanium dioxide, carbon black, zinc oxide, Prussian Blue, cadmium sulphide, iron oxides, vermillion, ultramarine and chrome pigments including chromates of lead, zinc, barium and calcium and the various mixtures and modifications thereof such as are commercially available as greenish-yellow to red pigments under the name primrose, lemon, middle, orange, scarlet and red chromes.

As examples of organic pigments there may be mentioned pigments of the azo, thioindigo, anthraquinone, anthranthrone, isodibenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs. Such pigments are described in, for example, volume 2 of the 2nd Edition of the Colour Index which was published in 1956 under the heading "Pigments" and in subsequent authorised amendments thereto. Preferred pigments are carbon black and especially copper phthalocyanine and its nuclear halogenated derivatives. When the pigment is $\beta$-form copper phthalocyanine it may be the normal pigmentary form of the copper phthalocyanine or it may be crude copper phthalocyanine.

The dyestuffs of the invention are particularly valuable for the preparation of pigmentary dispersions of copper phthalocyanine directly from crude copper phthalocyanine. A preferred class of the dyestuffs for use in the pigment dispersions are those obtained by reacting chloromethylated copper phthalocyanine with the polyester, and particularly with a polyester derived from 12-hydroxystearic acid optionally containing minor amounts of stearic and/or palmitic acid.

The dispersions of the invention are fluid or semi-fluid compositions containing the pigment in finely divided and deflocculated form, and can be used for any purpose for which dispersions of these particular solids are conventionally used. Thus the dispersions are of particular value in the manufacture of printing inks, by incorporating the dispersions with the other components conventionally used in the manufacture of such inks. The dispersions are also of value in the manufacture of paints, for which purpose the dispersions are incorporated into conventional alkyd or other resins. Alternatively, the dyestuffs of the invention can be used as dispersing agents in the production of dispersions of other dyestuffs, such as Acid Dyestuffs, Disperse Dyestuffs and Basic Dyestuffs, in organic liquids, such dispersions being used for the solvent dyeing of textiles.

The invention is illustrated but not limited by the following Examples in which the parts and percentages are by weight.

Polyesters were prepared as follows:

Polyester A

A mixture of 348 parts of xylene and 3350 parts of a commercial grade of 12-hydroxystearic acid (having acid and hydroxyl values of 182 mg.KOH/gm. and 160 mg.KOH/gm. respectively) is stirred for 22 hours at 190° to 200° C, the water formed in the reaction being separated from the xylene in the distillate which is then returned to the reaction medium. After 152 parts of water have been collected, the xylene is removed by heating at 200° C in a stream of nitrogen. The resulting pale amber coloured liquid has an acid value of 33.0 mgms KOH/gm. Since the commercial starting material is a mixture of the 12-hydroxy and the hydroxy-free stearic acid Polyester A consists of a mixture of polyesters of the general formulae

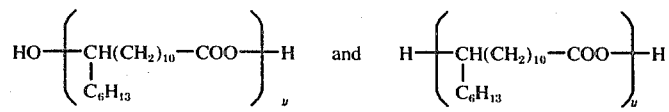

where, from the acid value, it can be calculated that the average value of $y = 6.2$.

Polyester B

A mixture of 130 parts of xylene, 126 parts of stearic acid and 716 parts of 12-hydroxystearic acid is heated for 22 hours at 190° C to 200° C, the water formed in the reaction being separated from the xylene in the distillate which is then returned to the reaction mixture. The xylene is then removed by heating at 180° C at a pressure less than atmospheric. The residual liquid is cooled to 50° C, and equal volume of a petroleum fraction boiling in the range of 100° to 120° C is added, the mixture cooled to 10° C and the mixture filtered to remove stearic acid. The solvent is then removed by distillation at 100° C under reduced pressure, leaving the polyester in the form of a pale amber coloured viscous liquid having an acid value of 58.6 mgms KOH/gm. Polyester B is a mixture of polyesters of the same general formulae as Polyester A except that from the acid value it is calculated that the average value of $y = 3.3$.

Polyester C

A mixture of 65 parts of xylene and 500 parts of a commercially available grade of ricinoleic acid is heated for 22 hours at 190° C to 200° C, the water being distilled off as it is formed. The xylene is then removed by distillation at 150° C at reduced pressure. The resulting polyester has an acid value of 13.7 mgms KOH/gm.

Since the commercial starting material is a mixture of ricinoleic acid and oleic acid Polyester C consists of a mixture of polyesters of the general formulae

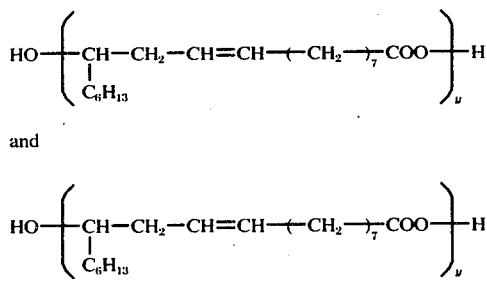

and $$HO-\left[-CH-CH_2-CH=CH-(-CH_2-)_{7}-COO-\right]_y-H$$
$$\qquad \quad |$$
$$\qquad C_6H_{13}$$

where, from the acid value, it can be calculated that the average value of $y = 14.6$.

Polyester D

A mixture of 96 parts of xylene, 150 parts of oleic acid and 850 parts of ricinoleic acid is heated for 22 hours at 190° to 200° C, the water being distilled off as it is formed. The xylene is then removed by distillation at 150° C under reduced pressure. The resulting polyester has an acid value of 36.6 mgms. KOH/gm.

Polyester D is a mixture of polyester of the same general formulae as Polyester C except that from the acid value it is calculated that the average value of $y = 5.4$.

Polyester E

A mixture of 706 parts of 12-hydroxystearic acid, 489 parts of stearic acid and 2.5 parts of tetrabutyl titanate is stirred at 190° to 200° C for 5 hours in a current of nitrogen. 100 Parts of the product are dissolved while still hot in 147 parts of a petroleum fraction boiling at 100° to 120° C. After cooling in ice and filtering, the solution is evaporated at 100°, finally under reduced pressure (water pump), leaving 79.7 parts of an oil of acid value 83.3 mg KOH/g. Polyester E is a mixture of polyesters of the same general formulae as Polyester A except that from the acid value it is calculated that the average value of $y = 2.4$.

EXAMPLE 1

A mixture of 44.3 parts of Polyester A, 15.3 parts of a 25% aqueous solution of tetraethylammonium hydroxide, 6 parts of copper tris(chloromethyl) phthalocyanine and 72 parts of methyl isobutylketone is stirred for 16 hours at the boil under a reflux condenser fitted with a trap to remove the water. The methyl isobutylketone is then distilled off under reduced pressure leaving the crude dyestuff as a deep blue viscous liquid.

EXAMPLE 2

A mixture of 44.3 parts of Polyester A, 9.5 parts of a commercially available grade of cetyl trimethylammonium bromide, 72 parts of methyl isobutyl ketone, 3.4 parts of a 32% aqueous solution of sodium hydroxide and 6 parts of copper tris(chloromethyl) phthalocyanine is stirred for 16 hours under reflux condenser fitted with a trap to remove the water. The solvent is then removed in a current of nitrogen leaving the crude product as a deep blue viscous liquid.

EXAMPLE 3

The procedure of Example 2 is repeated except that only 1 part of the cetyl trimethylammonium bromide is used. A similar product is obtained.

EXAMPLE 4

A mixture of 44.3 parts of Polyester A, 1 part of the cetyl trimethylammonium bromide, 1.4 parts of sodium carbonate, 6 parts of copper tris(chloromethyl)phthalocyanine and 64 parts of a petroleum fraction boiling at 100° to 120° C is stirred for 16 hours at the boil under a reflux condenser fitted with a trap to remove the water. The solution is cooled and is decanted from a little solid matter. The solution contains 47.9% of crude dyestuff.

EXAMPLE 5

A mixture of 54 parts of Polyester B, 2 parts of the cetyltrimethylammonium bromide, 2.8 parts of sodium carbonate, 12 parts of copper tris(chloromethyl)phthalocyanine and 64 parts of a petroleum fraction boiling at 100° to 120° C is stirred for 16 hours under a reflux condenser at 111° C, the water present being separated using a trap. The resulting solution containing 54.0% of crude dyestuff is then decanted from a trace of solid matter.

EXAMPLE 6

A mixture of 53.5 Polyester C, 0.5 part of the cetyl trimethylammonium bromide, 0.7 part of sodium carbonate, 3 parts of copper tris(chloromethyl)phthalocyanine and 64 parts of a petroleum fraction boiling at 100° to 120° C is stirred for 16 hours at the boil under a reflux condenser fitted with a trap to remove water. The resulting solution containing 53.9% of crude dyestuff is then decanted from a trace of solid matter.

EXAMPLE 7

A mixture of 40 parts of Polyester D, 1 part of the cetyl trimethylammonium bromide, 1.4 parts of sodium carbonate, 6 parts of copper tris(chloromethyl)phthalocyanine and 64 parts of a petroleum fraction boiling at 100° to 120° C. is stirred for 16 hours at the boil under a reflux condenser fitted with a trap to remove water. The resulting solution containing 47.7% of crude dyestuff is then decanted from a trace of solid matter.

EXAMPLE 8

A mixture of 36.2 parts of a polyester having an acid value of 35.5 mgms KOH/gm. prepared from a commercial grade of 12-hydroxystearic acid, 0.76 part of the cetyl trimethylammonium bromide, 1.06 parts of sodium carbonate, 4.55 parts of copper tris(-chloromethyl) phthalocyanine and 18 parts of a petroleum fraction boiling at 100° to 120° C. is stirred for 16 hours at the boil under a reflux condenser fitted with a trap to remove water. The solution is then filtered to remove a trace of solid material. The solution contains 69.6% of crude dyestuff.

EXAMPLE 9

The procedure of Example 8 is repeated but after filtering to remove the trace of solid material, the filtrate is successively extracted with (a) water, (b) acetone, (c) isobutanol (several times) and (d) acetone, and is then dried. The resulting product is in the form of a dark blue tar.

The infra red absorption spectrum of the dyestuff shows no bands at 2500–3500 cm$^{-1}$ and 1712 cm$^{-1}$ (due to —COOH groups and which were clearly visible in the I.R. absorption spectrum of the polyester used as starting material), nor at 1600 cm$^{-1}$ due to —COO$^{-}$ groups; but bands at 1730 cm$^{-1}$ and 1180 cm$^{-1}$ indicate the presence of ester groups.

EXAMPLE 10

A mixture of 40 parts of the polyester used in Example 8, 0.8 part of the cetyl trimethylammonium bromide, 1.2 parts of sodium carbonate, 10 parts of 1-($\gamma$-chloro-$\beta$-hydroxypropylamino)-4-[4'-($\beta$-hydroxyethoxy)anilino]anthraquinone and 71 parts of a petroleum fraction boiling at 100° to 120° C. is stirred for 16 hours at the boil under a reflux condenser fitted with a trap to remove water. The solvent is then removed by heating at 140° C. in a current of nitrogen, leaving the crude product in the form of a dark blue viscous liquid.

EXAMPLE 11

In place of the anthraquinone compound used in Example 10 there is used 10 parts of 2-methyl-4-N:N-di($\beta$-hydroxyethyl)amino-4'-(N-$\beta$-chloroethylsulphonamido)-azobenzene. The resulting product is a deep brown viscous liquid.

EXAMPLE 12

In place of the anthraquinone compound used in Example 10 there is used 10.7 parts of 1-($\beta$-hydroxyethylamino)-4-[2'-bromo-4'-(N-$\beta$-chloroethylsulphonamido)phenylazo]-naphthalene. The product is a deep red viscous liquid.

EXAMPLE 13

A mixture of 18.2 parts of the polyester used in Example 8, 0.4 part of the cetyltrimethylammonium bromide, 0.55 part of sodium carbonate, 6 parts of copper mono(chloromethyl)phthalocyanine and 35.5 parts of a petroleum fraction boiling at 100° to 120° C. is stirred for 16 hours at the boil under a reflux condenser fitted with a trap to remove water. The solvent is then removed in a current of nitrogen leaving a deep blue tar.

EXAMPLE 14

A mixture of 36.3 parts of the polyester used in Example 8, 0.76 part of the cetyl trimethylammonium bromide, 1.06 parts of sodium carbonate, 3.04 parts of copper pentakis(chloromethyl)-phthalocyanine and 35.5 parts of a petroleum fraction boiling at 100° to 120° C. is stirred for 16 hours at the boil under a reflux condenser fitted with a trap to remove water. The solvent is then removed in a stream of nitrogen leaving a deep blue viscous liquid.

EXAMPLE 15

A mixture of 3 parts of $\beta$-form copper phthalocyanine, 0.6 part of the dyestuff of Example 9 and 6.4 parts of a petroleum fraction boiling at 100° to 120° C. is ball milled for 16 hours to give a finely divided well deflocculated dispersion of the pigment which is suitable for use in a gravure printing ink.

Similar finely divided well deflocculated dispersions are obtained when the 0.6 part of the dyestuff of Example 9 is replaced by 0.6 part of each of the dyestuffs of Examples 1, 2, 3 and 14 or by using such quantities of the dyestuff solutions of Examples 4, 5 and 8 as contain 0.6 part of crude dyestuff.

EXAMPLE 16

A mixture of 3 parts of $\beta$-form copper phthalocyanine, 1.5 parts of the dyestuff of Example 10 and 5.5 parts of a petroleum fraction boiling at 100° to 120° C. is milled for 16 hours to to give a finely divided well deflocculated dispersion of the pigment suitable for use in a gravure printing ink.

The following Table gives further Examples of dispersions which are obtained by milling together, in the quantities stated, the pigments listed in the column of the Table, the dyestuffs or dyestuff solutions listed in the third column of the Table and the organic liquids listed in the fourth column of the Table. In each case finely divided well deflocculated dispersions of the pigments were obtained.

| Example | Pigment | Dyestuff or Dyestuff Solution | Organic Liquid |
| --- | --- | --- | --- |
| 17 | 3 parts of the pigment obtained by coupling tetrazotised 3:3'-dichlorobenzidine with acetoacetanilide | 1.5 parts of the dyestuff of Example 11 | 5.5 parts of a petroleum fraction boiling at 100° to 120° C. |
| 18 | 3 parts of 1-(2'-nitro-4'-methylphenylazo)-2-naphthol | 1.5 parts of the dyestuff of Example 12 | " |
| 19 | 3 parts of $\beta$-form copper phthalocyanine | 1.5 parts of the dyestuff of Example 13 | " |
| 20 | " | 2.8 parts of the dyestuff solution of Example 6 | 4.2 parts of a petroleum fraction boiling at 100° to 120° C |
| 21 | " | 3.1 parts of the dyestuff solution of Example 7 | 3.9 parts of a petroleum fraction boiling at 100° to 120° C. |

-continued

| Example | Pigment | Dyestuff or Dyestuff Solution | Organic Liquid |
| --- | --- | --- | --- |
| 22 | 3 parts of indanthrone | 0.9 part of the dyestuff solution of Example 8 | 6.1 parts of a petroleum fraction boiling at 100° to 120° C. |
| 23 | 3 parts of a rosinated calcium toner of 1-(2'-sulpho-4'-methylphenylazo)-2-naphthol-3-carboxylic acid | " | " |
| 24 | 3 parts of lead sulphochromate | " | " |
| 25 | 3 parts of a nickel toner of 3-(4'-chlorophenylazo)quinoline 2:4-diol | " | " |
| 26 | 3 parts of Prussian Blue | " | " |
| 27 | 3 parts of an aluminium lake of 1:4-dihydroxyanthraquinone-2-sulphonic acid | 0.9 part of the dyestuff solution of Example 8 | 6.1 parts of a petroleum fraction boiling at 100° to 120° C. |
| 28 | 3 parts of Tioxide RCR which is a coated form of rutile titanium dioxide | " | " |
| 29 | Iron oxide | " | " |
| 30 | 3 parts of carbon black | " | " |
| 31 | 3 parts of copper polychlorophthalocyanine | " | " |
| 32 | 3 parts of 4:10-dibromoanthanthrone | " | " |
| 33 | 3 parts of the phosphomolybdotungstate of C.I. Basic Blue 7 (42595) | " | " |
| 34 | 3 parts of β-form copper phthalocyanine | 1.5 parts of the dyestuff of Example 1 | 5.5 parts of n-hexane |
| 35 | " | " | 5.5 parts of cyclohexane |
| 36 | " | " | 5.5 parts of xylene |

EXAMPLE 37

A mixture of 60 parts of crude copper phthalocyanine, 15 parts of the dyestuff of Example 3 and 125 parts of a petroleum fraction boiling at 100° to 120° C. is ball milled to give a fluid deflocculated dispersion of the copper phthalocyanine containing no particles greater then 3 $\mu$ and the majority of the particles being less than 1 $\mu$.

The dispersion is suitable for use in gravure printing inks and shows increased strength, enhanced finish and greenness compared with conventional dispersions of β-form copper phthalocyanine.

EXAMPLE 38

25 Parts of β-form copper phthalocyanine, 5 parts of the dyestuff of Example 3 and 10 parts of a petroleum fraction boiling at 260° to 290° C. are charged to a mixer of the Baker-Perkins type and plastic milled for 60 minutes. A further 3.6 parts of the same petroleum fraction are added and mixing continued for a further 15 minutes to give a homogeneous viscous paste. The paste, which contains 57.5% of pigment, is suitable for use in letterpress printing inks.

EXAMPLE 39

60 Parts of a furnance grade carbon black having a surface area of 80 sq. meters/gm., 15.7 parts of the dyestuff solution of Example 4, 74.3 parts of a petroleum fraction boiling at 100° C to 120° C. and 500 parts of 6 mm diameter steatite balls are charged to a container which is sealed and then placed on a roller mill which is operated for 24 hours at 100 r.p.m. The contents of the container are then passed through a sieve to remove the balls. The product is a free flowing paste of finely dispersed carbon black.

When this paste is mixed with a gravure ink varnish such as a solution of zinc/calcium rosinate in a hydrocarbon solvent, a black gravure ink is obtained which has good gloss and tinctorial properties and in which the carbon black is finely dispersed.

EXAMPLE 40

A mixture of 10 parts of 1:5-dihydroxy-4:8-diamino-2-(p-hydroxyphenyl)-6-hydroxymethylanthraquinone 4.2 parts of the dyestuff solution of Example 4 and 160 parts of perchloroethylene is ball milled for 16 hours to give a well deflocculated dispersion of the anthraquinone dyestuff which can be used for the solvent dyeing of aromatic polyester textile materials.

EXAMPLE 41

A mixture of 7.2 parts of the dyestuff solution of Example 8, 2.8 parts of perchloroethylene and 0.5 part of an adduct of a mixture of oleyl and cetyl alcohols with 2.5 mols of ethylene oxide is added to a solution of 2 parts of an adduct of cetyl alcohol with 17 mols of ethylene oxide in 194 parts of water containing 6 parts of sulphuric acid, and the whole is emulsified by high speed agitation.

5 Parts of crude copper phthalocyanine is milled in the presence of a water-soluble inorganic salt, the salt is removed by washing and the resulting α-form copper phthalocyanine is heated in 100 parts of dilute sulphuric acid to dissolve metallic impurities. 42 Parts of the above emulsion are added at 60° C., the mixture stirred for 15 minutes, the slurry filtered and the pigment washed with water and dried.

An ink is prepared by grinding 1.08 parts of the dried pigment with 0.92 part of a synthetic letterpress litho printing ink varnish (viscous alkyd medium). The ink is much less viscous than a control ink which was similarly prepared from the crude copper phthalocyanine except that no emulsion was added to the pigment slurry, and prints made from this ink have equal strength, but greater brightness, compared with prints made from the control ink.

EXAMPLE 42

A mixture of 36.3 parts of the polyester used in Example 8, 0.76 part of the cetyl trimethylammonium bromide, 1.06 parts of sodium carbonate, 5.15 parts of a chloromethylated p:p'-di(6-methylbenzthiazol-2-yl)azobenzene containing 13.1% of chlorine and 36 parts of a petroleum fraction boiling at 100° to 120° C is stirred for 16 hours at the boil under a reflux condenser fitted with a trap to remove water. The solvent is then removed at 110° C in a current of nitrogen leaving the crude dye stuff in the form of a brown gum.

EXAMPLE 43

A mixture of 3 parts of the pigment obtained by coupling tetrazotised 3:3'-dichloro-4:4'-diaminodiphenyl with acetoacetanilide, 0.6 part of the dyestuff of Example 42 and 6.4 parts of a petroleum fraction boiling at 100° to 120° C is ball milled for 16 hours to give a finely divided, well deflocculated dispersion of the pigment.

EXAMPLE 44

A mixture of 36.3 parts of the polyester used in Example 8, 0.76 part of n-hexadecyl tri-n-propylphosphonium bromide, 1.06 parts of sodium carbonate, 4.55 parts of copper tris(chloromethyl)-phthalocyanine and 36 parts of a petroleum fraction boiling at 100° to 120° C is stirred for 16 hours at the boil under a reflux condenser fitted with a trap to remove water. The solvent is then removed at 110° C in a stream of nitrogen leaving the crude dyestuff as a deep blue viscous liquid.

EXAMPLE 45

A mixture of 3 parts of $\beta$-form copper phthalocyanine, 0.6 part of the dyestuff of Example 44 and 6.4 parts of a petroleum fraction boiling at 100° to 120° C is ball milled for 16 hours to give a finely divided, well deflocculated dispersion of the pigment.

EXAMPLE 46

96 Parts of crude copper phthalocyanine, 24 parts of the dyestuff of Example 3, 12.8 parts of zinc rosinate and 167.2 parts of a petroleum fraction boiling at 100° to 120° C are stirred together in a stainless steel vessel equipped with a stirrer having 3 discs each 10 cms. in diameter and 8 mms. in thickness. 1000 Parts of glass beads having a diameter of 0.6 to 0.7 mm. are added and the mixture stirred for 60 minutes at 1880 r.p.m. After this time the dispersion contains no significant number of pigment particles having a size above 3 microns, and the majority of the pigment particles are less than 1 micron. The pigment dispersion is then separated from the glass beads.

The resulting dispersion consists essentially of a $\beta$-form copper phthalocyanine pigment dispersion of high tinctorial strength and which possesses greenness and brightness of shade when used in a gravure printing ink.

EXAMPLE 47

A mixture of 64 parts of crude copper phthalocyanine, 16 parts of the dyestuff of Example 3, 12.8 parts of zinc rosinate and 107.2 parts of a petroleum fraction boiling at 100° to 120° C is ball milled to give a fluid, deflocculated dispersion of the copper phthalocyanine having no particles greater than 3 microns and the majority of the particles being less than 1 micron.

This dispersion is suitable for use in gravure printing inks and gives inks of increased strength, enhanced finish and greenness compared with inks prepared from conventional dispersions of $\beta$-form copper phthalocyanine.

EXAMPLE 48

A mixture of 31.6 parts of Polyester A, 37 parts of a petroleum fraction boiling at 100° to 120° C, 0.75 part of cetyl trimethylammonium bromide, 1.05 parts of sodium carbonate and 4 parts of 1,4-bis($\gamma$-chloro-$\beta$-hydroxypropylamino)-anthraquinone is stirred whilst 7 parts of the petroleum fraction are distilled out. The mixture is then boiled under reflux for 16 hours. The petroleum fraction is finally distilled out at 120° C in a current of nitrogen, leaving the crude dyestuff as a viscous blue tar.

EXAMPLE 49

A mixture of 3 parts of $\beta$-form copper phthalocyanine, 1.5 parts of the dyestuff of Example 48 and 5.5 parts of a petroleum fraction boiling at 100° to 120° C is ball milled for 16 hours to give a finely divided deflocculated dispersion of the pigment.

EXAMPLE 50

A mixture of 30.2 parts of Polyester A, 0.72 part of a commercially available grade of cetyl trimethylammonium bromide, 1.2 parts of sodium carbonte, 6.7 parts of a sulphonamide prepared as described below and 39 parts of toluene is stirred for 16 hours at the boil under a reflux condenser fitted with a trap to remove the water. The resulting solution contains 58.3% of crude dyestuff.

The sulphonamide used above is prepared as follows. 357 Parts of chlorosulphonic acid are stirred whilst 65 parts of copper phthalocyanine are added below 50° C. After stirring for 16 hours at 138°–140° C it is cooled to 90° C and 94.5 parts of phosphorus trichloride are added during 1 hour. It is then stirred for 2 hours at 90°–93° C and cooled. 92 Parts of this solution are added to excess ice, the precipitated sulphonyl chloride is filtered off and washed with ice cold water. 28 parts of N-(3-chloro-2-hydroxypropyl)-p-toluidine are dissolved in 158 parts of isopropanol at 30°–35° C. 12 parts of sodium bicarbonate are added, followed by the sulphonyl chloride filter cake. After stirring at 20° C for 16 hours, 600 parts of water are added and the sulphonamide is filtered off and washed with water. It is then stirred with a mixture of 29 parts of hydrochloric acid and 250 parts of water for 10 minutes to dissolve unreacted amine, after which the sulphonamide is filtered off, washed acid-free and dried at 20° C. It contains 10% of chlorine. The infra red spectrum shows bands at 1350 and 1162 cm$^{-1}$ due to sulphonamide groups.

EXAMPLE 51

A mixture of 3 parts of $\beta$-form copper phthalocyanine, 1.28 parts of the 58.3% dyestuff solution of Example 50 and 5.72 parts of a petroleum fraction boiling at 100° to 120° C is ball milled for 16 hours to give a finely divided well deflocculated dispersion of the pigment.

EXAMPLE 52

A mixture of 23 parts of Polyester A, 28.2 parts of a petroleum fraction boiling at 100° to 120° C, 0.5 part of acetyl trimethylammonium bromide, 0.76 part of sodium carbonate and 3.9 parts of 1,4-bis-(m-chloromethylbenzoylamino)-anthraquinone is stirred for 16 hours at the boil under a reflux condenser fitted with a trap to remove water. The resulting solution contains 50% of crude dyestuff.

EXAMPLE 53

A mixture of 23 parts of Polyester A, 28.5 parts of a petroleum fraction boiling at 100° to 120° C, 0.5 part of cetyl trimethylammonium bromide, 0.76 part of sodium carbonate and 4.25 parts of 1-($\alpha$-chloroacetylamino)-anthraquinon is stirred for 16 hours at the boil under a reflux condenser fitted with a trap to remove water. The resulting solution contains 50% of crude dyestuff.

EXAMPLE 54

A mixture of 23 parts of Polyester A, 30.4 parts of a petroleum fraction boiling at 100° to 120° C, 0.54 part of cetyl trimethylammonium bromide, 0.76 part of sodium carbonate and 6.08 parts of 1-($\alpha$-chloroacetylamino)-4-benzoylamino-anthraquinone is stirred for 16 hours at the boil under a reflux condenser fitted with a trap to remove water. The petroleum fraction is distilled off as xylene is gradually added. After boiling under reflux for a further 2 hours, 67 parts of a 45.4% solution of crude dyestuff is obtained.

EXAMPLE 55

A mixture of 31.7 parts of xylene, 23 parts of Polyester A, 0.76 part of sodium carbonate, 0.54 part of cetyl trimethylammonium bromide and 7.8 parts of 1-chloroacetylamino-5,8-bis(benzoylamino)-anthraquinone is stirred for 16 hours at the boil under a reflux condenser fitted with a trap to remove water. The xylene is then removed by evaporation leaving the crude dyestuff as a viscous liquid.

EXAMPLE 56

A mixture of 25.9 parts of xylene, 23 parts of Polyester A, 0.76 part of sodium carbonate, 0.54 part of cetyl trimethylammonium bromide and 1.99 parts of 1,4,5,8-tetrakis-(chloroacetylamino)-anthraquinone is converted to the dyestuff as described in Example 55.

EXAMPLE 57

A mixture of 28.6 parts of xylene, 23 parts of Polyester A, 0.76 part of sodium carbonate, 0.54 part of cetyl trimethylammonium bromide and 4.77 parts of 4,4'-bis-(chloroacetylamino)-1,1'-dianthraquinonylamine is converted to the dyestuff as described in Example 55.

EXAMPLE 58

A mixture of 81.6 parts of Polyester C, 5.27 parts of 1,4-bis-(m-chloromethylbenzoylamino)-anthraquinone, 1.06 parts of sodium carbonate, 0.76 part of cetyl trimethylammonium bromide and 88 parts of a petroleum fraction boiling at 100° to 120° C is stirred for 16 hours at the boil under a reflux condenser fitted with a trap to remove water. The resulting solution contains 50% of crude dyestuff.

EXAMPLE 59

A mixture of 26.4 parts of xylene, 23 parts of Polyester A, 0.76 part of sodium carbonate, 0.54 part of cetyl trimethylammonium bromide and 2.51 parts of 1,4-bis-(2'-chloroethylamino)-anthraquinone is converted to the dyestuff as described in Example 55.

EXAMPLE 60

A mixture of 14.8 parts of a petroleum fraction boiling at 100° to 120° C, 9.7 parts of Polyester E, 0.76 part of sodium carbonate, 0.5 part of cetyl trimethylammonium bromide and 4.25 parts of 1-($\alpha$-chloroacetylamino)-anthraquinone is stirred for 16 hours at the boil under a reflux condenser fitted with a trap to remove water. A further 22 parts of the petroleum fraction is added and the 35.5% solution of the crude dyestuff decanted from a small quantity of undissolved solid.

EXAMPLE 61

A mixture of 108 parts of Polyester A, 15 parts of 2-aminoanthraquinone and 16.4 parts of thionyl chloride is stirred at 100° to 105° C for 5 hours then toluene is gradually added and simultaneously distilled off to remove unchanged thionyl chloride. The residual toluene is evaporated off leaving the crude dyestuff as a gum.

EXAMPLE 62

A mixture of 35 parts of Polyester A, 5 parts of 4,4'-diamino-1,1'-dianthraquinonylamine and 6.6 parts of thionyl chloride is stirred at 100°–110° C for 16 hours then toluene is gradually added and simultaneously distilled off to remove unchanged thionyl chloride. The residual toluene is evaporated off leaving the crude dyestuff as a gum.

EXAMPLE 63

A mixture of 28.5 parts of toluene, 23 parts of Polyester A, 0.76 part of sodium carbonate, 0.55 part of cetyl trimethylammonium bromide and 4.66 parts of 1,4-dianilinoanthraquinone bis-(sulphon-$\beta$-chloroethylamide) is stirred for 16 hours at the boil under a reflux condenser fitted with a trap to remove water. The toluene is then evaporated, leaving the crude dyestuff as a blue gum.

EXAMPLE 64

A mixture of 3 parts of $\beta$-form copper phthalocyanine, 6 parts of the dyestuff solution of Example 52 and 1 part of a petroleum fraction boiling at 100° to 120° C is ball milled for 16 hours to give a finely divided well deflocculated dispersion of the pigment.

The following Table gives further examples of finely divided well deflocculated dispersions which are obtained by milling together, in the quantities stated, the pigments listed in the second column of Table, the dyestuffs or dyestuff solutions listed in the third column of the Table and the organic liquids listed in the fourth column of the Table.

| Example | Pigment | Dyestuff or Dyestuff solution | Organic Liquid |
|---|---|---|---|
| 65 | 3 parts of $\beta$-form copper phthalocyanine | 3 parts of the Dyestuff Solution of Example 52 | 4 parts of a petroleum fraction boiling at |

-continued

| Example | Pigment | Dyestuff or Dyestuff solution | Organic Liquid |
|---|---|---|---|
| 66 | " | 3 parts of the Dyestuff Solution of Example 53 | 100° to 120° C. 1 part of a petroleum fraction boiling at 100° to 120 C. |
| 67 | 3 parts of a rosinated calcium toner of 1-(2'-sulpho-4'-methylphenylazo)-2-naphthol-3-carboxylic acid | 3 parts of the Dyestuff Solution of Example 52 | 4 parts of a petroleum fraction boiling at 100° to 120° C. |
| 68 | 3 parts of lead sulphochromate | 3 parts of the Dyestuff Solution of Example 53 | " |
| 69 | 3 parts of a nickel toner of 3-(4'-chlorophenylazo)-quinoline-2,4-diol | " | " |
| 70 | 3 parts of Tioxide RCR which is a coated form of rutile titanium dioxide | " | " |
| 71 | 3 parts of flavanthrone | " | " |
| 72 | 3 parts of an aluminium lake of 1,4-dihydroxy-anthraquinone-2-sulphonic acid | 1.5 parts of the dyestuff of Example 48 | 5.5 parts of a petroleum fraction boiling at 100° to 120° C. |
| 73 | 3 parts of copper polychloro-phthalocyanine | " | " |
| 74 | 3 parts of indanthrone | 1.5 parts of the dyestuff of Example 48 | 5.5 parts of a petroleum fraction boiling at 100° to 120° C. |
| 75 | 3 parts of 8, 18-dichloro-5,15-diethyldi-indolo(3,2-b,3',2'-m)-5,15 dehydrotriphendioxazine | " | " |
| 76 | 3 parts of carbon black | " | " |
| 77 | 3 parts of the phospho-molybdotungstate of C.I. Basic Blue 7 (42595) | " | " |
| 78 | 3 parts of the pigment obtained by coupling tetrazotised 3,3'-dichloro-benzidine with acetoacetanilide | 3 parts of the dyestuff of Example 53 | 4 parts of a petroleum fraction boiling at 100° to 120° C. |
| 79 | 3 parts of β-form copper phthalocyanine | 3.3 parts of the dyestuff solution of Example 54 | 3.7 parts of a petroleum fraction boiling at 100° to 120° C. |
| 80 | 3 parts of β-form copper phthalocyanine | 1.5 parts of the dyestuff of Example 55 | 5.5 parts of a petroleum fraction boiling at 100° to 120° C. |
| 81 | " | 1.5 parts of the dyestuff solution of Example 56 | " |
| 82 | 3 parts of β-form copper phthalocyanine | 1.5 parts of the dyestuff of Example 57 | 5.5 parts of a petroleum fraction boiling at 100° to 120° C. |
| 83 | " | 3 parts of the dyestuff solution of Example 58 | 4 parts of a petroleum fraction boiling at 100° to 120° C. |
| 84 | 3 parts of copper polychloro-phthalocyanine | 1.5 parts of the dyestuff of Example 59 | 5.5 parts of a petroleum fraction boiling at 100° to 120° C. |
| 85 | " | 4.2 parts of the dyestuff solution of Example 60 | 2.8 parts of a petroleum fraction boiling at 100° to 120° C. |
| 86 | 3 parts of β-form copper phthalocyanine | 1.5 parts of the dyestuff of Example 61 | 5.5 parts of a petroleum fraction boiling at 100° to 120° C. |
| 87 | " | 1.5 parts of the dyestuff of Example 62 | " |
| 88 | " | 1.5 parts of the dyestuff of Example 63 | " |

What we claim is:
1. A dyestuff selected from the classes of dyestuff represented by the formulae

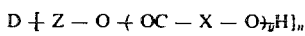

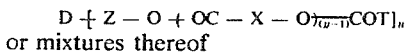

or mixtures thereof
wherein D is an anthraquinone radical which is free from water solubilising groups and which is attached to Z through a carbon atom on one of the benzene rings present in D; n is 1 to 4; Z is a linking group of the formula $-B)_m A-$ wherein B is $-NH-$, $-SO_2NH-$ or $-CO-NH-$, m is 0 or 1 and A is alkylene or β-hydroxy-alkylene containing up to 20 carbon atoms or monocyclic arylene-lower-alkylene, X is alkylene or alkenylene containing from 8 to 20 carbon atoms with at least 4 carbon atoms between the $-CO-$ and $-O-$ groups, T is alkyl or alkenyl containing from 8 to 20 carbon atoms and y is a positive integer between 2 and 20.

2. A dyestuff according to claim 1 represented by the formulae

wherein B is $-NH-$.

3. A dyestuff according to claim 2 having the formula
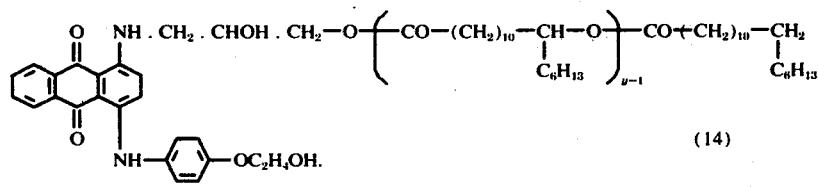
4. A dyestuff according to claim 1 comprising a mixture of
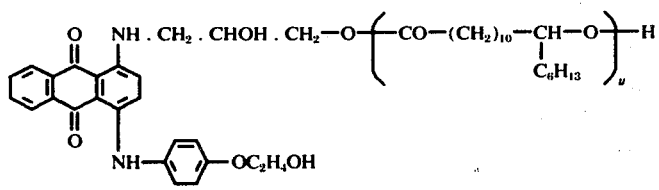
and
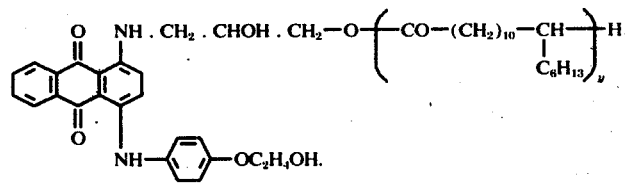
* * * * *